United States Patent
Yokoyama et al.

(10) Patent No.: US 6,202,024 B1
(45) Date of Patent: Mar. 13, 2001

(54) COMMUNICATORY NAVIGATION SYSTEM

(75) Inventors: Shoji Yokoyama; Tomoki Kubota, both of Tokyo-to; Yasuo Ito, Hokkaido; Naoki Gorai, Hokkaido; Takashi Sugawara, Hokkaido; Hideaki Morita, Tokyo-to; Satoshi Kitano, Hokkaido; Hiroki Ishikawa, Tokyo-to, all of (JP)

(73) Assignee: Kabushikikaisha Equos Research

( * ) Notice: Subject to any disclaimer, the term of this patent is extended or adjusted under 35 U.S.C. 154(b) by 0 days.

(21) Appl. No.: 09/271,166

(22) Filed: Mar. 18, 1999

(30) Foreign Application Priority Data

Mar. 23, 1998 (JP) .................................................. 10-092217

(51) Int. Cl.$^7$ .............................. G06G 7/78; G01C 21/00
(52) U.S. Cl. ......................... 701/207; 701/213; 701/200; 701/24
(58) Field of Search .................................. 701/207, 200, 701/24, 35, 213

(56) References Cited

U.S. PATENT DOCUMENTS

| | | | |
|---|---|---|---|
| 5,583,775 | * 12/1996 | Nobe et al. | 701/213 |
| 5,646,856 | * 7/1997 | Kaesser | 701/207 |
| 5,648,769 | * 7/1997 | Sato et al. | 340/988 |
| 5,790,974 | * 8/1998 | Tognazzini | 455/456 |
| 5,842,146 | * 11/1998 | Shishido | 701/210 |
| 5,928,305 | * 7/1999 | Nomura | 701/207 |
| 5,933,100 | * 8/1999 | Golding | 340/995 |
| 6,006,159 | * 12/1999 | Schmier et al. | 701/200 |
| 6,009,374 | * 12/1999 | Urahashi | 701/209 |

* cited by examiner

Primary Examiner—William A. Cuchlinski, Jr.
Assistant Examiner—Olga Hernandez
(74) Attorney, Agent, or Firm—Lorusso & Loud

(57) ABSTRACT

Disclosed is a communicatory navigation system including an information center (150), at least one navigation unit (100) each mounted on a vehicle and communication means for allowing bi-directional data communication between the information center and the navigation unit. Data transmission from the navigation unit to the information center is made during a period of communication that begins when the navigation unit become communicatable with the information center and ends when the bi-directional data communication therebetween is disconnected. The navigation unit is provided with a drive route history memory area (131) and an instrument operation history memory area (132), and data in these memory areas are transmitted to the information center, together with the vehicle current position data and the destination position data. The information center determines a recommended drive route from the current position to the destination, not only with reference to its own database (158) but also taking into consideration the history data. For example, if it is determined that there is a traffic accident or heavy traffic jam in some route, a bypass route is determined and transmitted back to the navigation unit. When the previous drive route indicated by data in area (131) is not found in the database (158), it can be recognized as a newly constructed road for inclusion in the database.

6 Claims, 16 Drawing Sheets

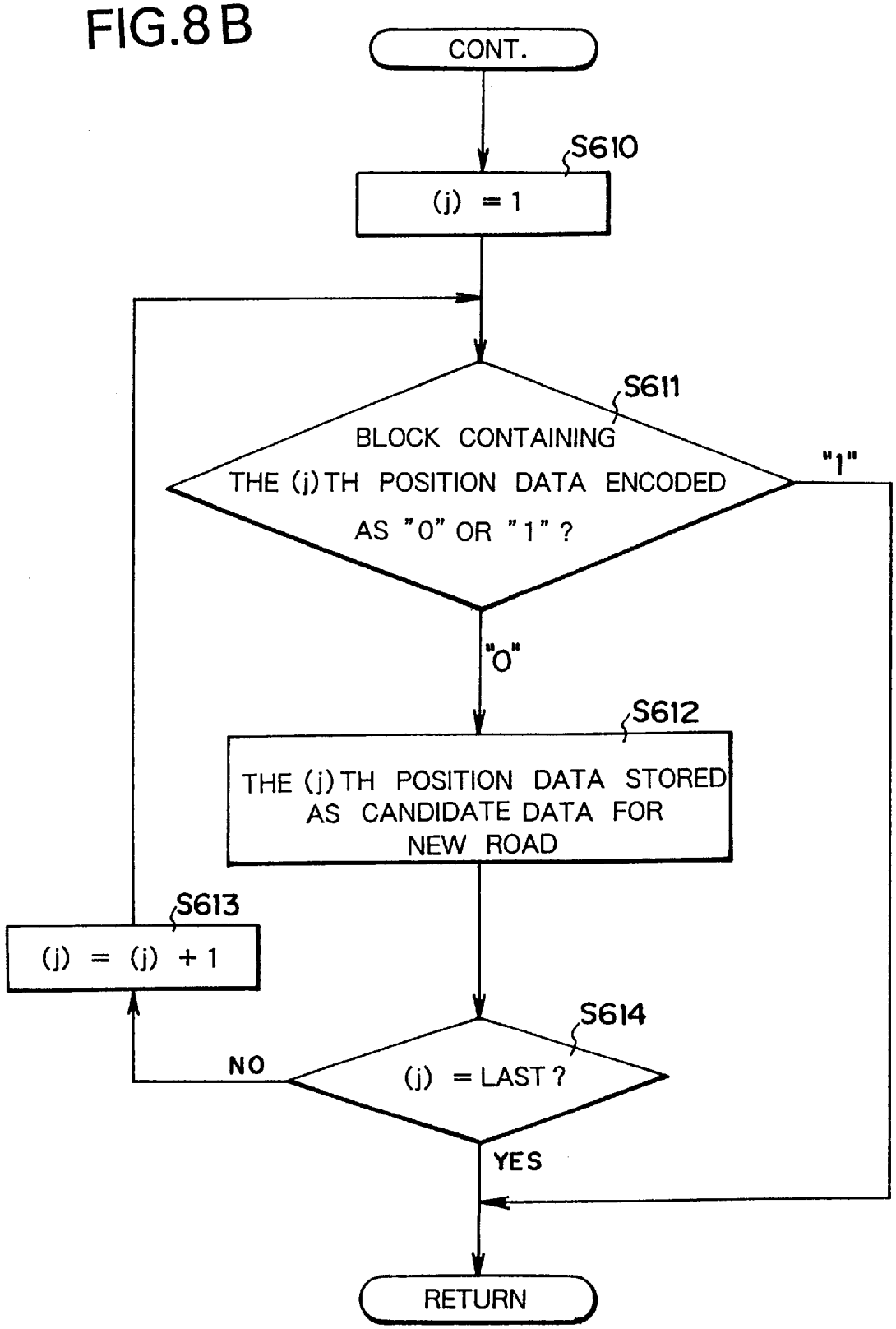

FIG.9
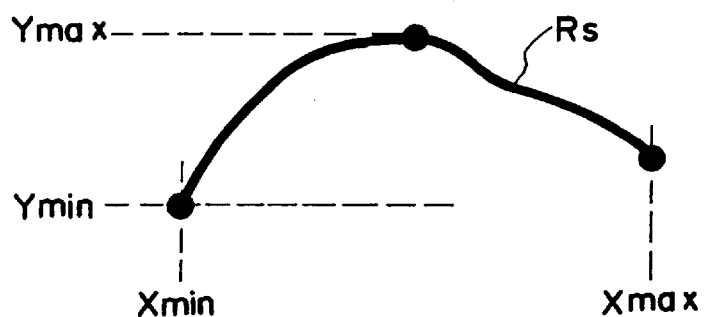
FIG.10
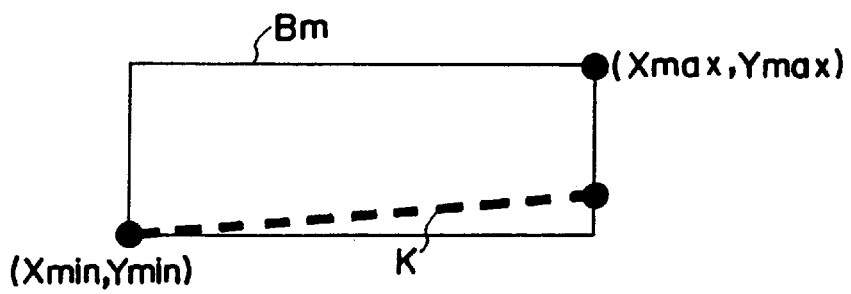
FIG.11
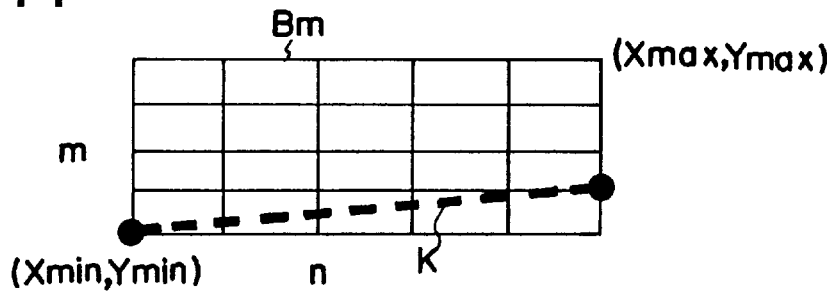
FIG.12
| 0 | 0 | 0 | 0 | 0 |
|---|---|---|---|---|
| 0 | 0 | 0 | 0 | 0 |
| 0 | 0 | 0 | 0 | 0 |
| 1 | 1 | 1 | 1 | 1 |

COMMUNICATORY NAVIGATION SYSTEM

BACKGROUND OF THE INVENTION

1. Field of the Invention

The present invention relates in general to a data transmitting and receiving system, and in more particular to a communicatory navigation system comprising an information center and a plurality of on-vehicle navigation units each communicatively connected to the information center.

2. Description of the Prior Art

The most important function of the navigation system mounted on a vehicle is of course to navigate the vehicle to drive from the current position to a predetermined destination along a suitable drive route. Most of conventional navigation systems have a control unit installed in the vehicle and data or information to be used for such drive route navigation are stored in a memory connected to the control unit, which may not be sufficient to store the increasing data that is necessary or at least desirable for smooth navigation in various situations.

To cope with this problem, a communicatory navigation system has recently been proposed and put to practical use. In the communicatory navigation system, there is installed an information center with a database memory of a great capacity from which supplementary data is transmitted to the on-vehicle navigation unit to thereby assist the drive route navigation. More particularly, the navigation unit obtains the current vehicle position data detected by a position sensor and the destination position data inputted by the user with any suitable input device, and transmits these items of data to the information center. Based on these items of position data received and in reference to the road data in the database memory, the information center makes a plan for a recommended drive route from the current position to the destination, and transmits the planned drive route back to the navigation unit. The navigation unit receiving the drive route from the information center will operate to display the drive route on a display and induce the driver to drive therealong.

There is an increasing demand of the navigation system that a drive route should be determined not only depending upon the current and destination position data but also by taking into consideration various conditions in or around the vehicle (referred to as "vehicle conditions" throughout the specification) such as weather conditions, road surface conditions, traffic jams, roads under construction, etc. For example, if there is a heavy traffic jam in the course of a specific drive route that is determined by normal discrimination, it is preferable to arrange another route bypassing the traffic jam point so that the driver is guided therealong to drive smoothly and reach the destination earlier. To achieve this, it is necessary that data indicating the vehicle condition, for example data indicating ON/OFF of a wiper and the past drive route data of the vehicle, is transmitted from the navigation unit to the information center. However, while the current and destination position data is being transmitted from the navigation unit to the information center, or while the drive route is transmitted from the information center to the navigation unit, so that the communication line or telephone line therebetween is busy, the same line can not be used for other data transmission. Another communication medium such as a hand phone may be used for transmission of the drive condition data, but in practice this is not preferable because it takes another communication charge and requires the user's calling operation.

Another problem in the prior art communicatory navigation system is a matter of version-up or updating of the road database. Although the information center may store a lot of the road database, a newly constructed road is not in the database unless the database is updated to include such a new road. Until the database is updated, no drive route including the new road can be determined by the information center.

SUMMARY OF THE INVENTION

Accordingly, it is a principal object of the present invention to provide a novel communicatory navigation system capable of providing the best drive route that is most suited in a particular situation in and around the vehicle.

Another object of the present invention is to provide a communicatory navigation system in which data transmission between the navigation unit and the information center is controlled to prevent jamming in communication therebetween.

Still another object of the present invention is to provide a communicatory navigation system in which the vehicle may be given a most preferable drive route from the current position to the destination position that bypasses any point or route with trouble such as a traffic accident, traffic jam, bad weather condition, bad road surface condition, etc.

Still another object of the present invention is to provide a communicatory navigation system in which a road database is automatically updated to include a newly constructed road or route soon after one or several of the member vehicles in the system passes through the new road.

In accordance with an aspect of the present invention, there is provided a communicatory navigation system comprising an information center and at least one navigation unit each mounted on a vehicle and communicatably connected to the information center. The navigation unit comprises first memory means for storing first data indicating previously driven routes of the vehicle, second memory means for storing second data indicating current conditions in and around the vehicle, communication means for allowing bi-directional data communication with the information center, and transmission control means for controlling the communication means such that either or both of the first and second data in the first and second memory means is automatically transmitted to the information center during a communicatable period from when the navigation unit become communicatable with the information center and before the bi-directional data communication therebetween is disconnected. Preferably, the transmission control means controls such that data transmission from the navigation unit to the information center is made during spare time within the communicatable period therebetween.

In accordance with another aspect of the present invention, there is provided a communicatory navigation system comprising an information center, at least one navigation unit each mounted on a vehicle and communication means for allowing bi-directional data communication between the information center and the navigation unit. The navigation unit comprises position sensor means for detecting a current position of the vehicle, destination input means for inputting a destination position of the vehicle, first memory means for storing first data indicating previously driven routes of the vehicle, second memory means for storing second data indicating current conditions in and around the vehicle, and data transmission means for transmitting to the information center, via the communication means, data including the current position data detected by the position sensor means, the destination data input by the destination input means and either or both of the first and second data in the first and second memory means. The information center comprises a database storing road data, and drive route finding means that operates in response to receiving of the data from the navigation unit to determine a recommended drive route from the current position to the destination position with reference to the road data stored in the database and in further consideration of the first and second data.

In accordance with another aspect of the present invention, there is provided a communicatory navigation system comprising an information center, at least one navigation unit each mounted on a vehicle and communication means for allowing bi-directional data communication between the information center and the navigation unit. The navigation unit comprises position sensor means for detecting a current position of the vehicle, destination input means for inputting a destination position of the vehicle, clock means for detecting the time when each of the vehicle current position is detected by the position sensor means, and data transmission means for transmitting the current position data detected by the position sensor, the destination position data input by the destination input means and the time data detected by the clock means. The information center comprises a database storing road data, traffic jam discriminating means for determining if there is a traffic jam between a specific section of a previously driven route of the vehicle from a distance between two of the vehicle current positions with reference to a time of passage between the two positions, and drive route finding means that operates in response to receiving the data from the navigation unit to determine a recommended drive route from the current position to the destination position with reference to the road data stored in the database, by further consideration of the result of the determination by the traffic jam discriminating means. The drive route finding means determines the drive route that can bypass any point or route of a traffic jam determined by the traffic jam discriminating means.

In accordance with another aspect of the present invention, there is provided a communicatory navigation system comprising an information center, at least one navigation unit each mounted on a vehicle and communication means for allowing bi-directional data communication between the information center and the navigation unit. The navigation unit comprises position sensor means for detecting a current position of the vehicle, destination input means for inputting a destination position of the vehicle, memory means for storing data indicating current conditions in and around the vehicle, and data transmission means for transmitting the current condition data stored in the memory means to the information center via the communication means. The information center comprises a database storing road data, drive condition discriminating means that statistically analyzes the current condition data received from the navigation unit, and drive route finding means that operates in response to receiving the data from the navigation unit to determine a recommended drive route from the current position to the destination position with reference to the road data stored in the database, by further consideration of the result of the analysis by the drive condition discriminating means. The current condition data may indicate operation of one or more instruments mounted on the vehicle selected from a group consisting of wipers, headlamps, ABS (anti-braking system), active suspension system and air-bag. The drive condition discriminating means determines current weather conditions, road surface conditions and traffic accidents in a specific area in response to receiving substantially the same current condition data from a plurality of the vehicles in the specific area. The drive route finding means determines the drive route that can bypass any point or route of trouble to be expected by the result of analysis by the drive condition discriminating means.

In accordance with still another aspect of the present invention, there is provided a communicatory navigation system comprising an information center, at least one navigation unit each mounted on a vehicle and communication means for allowing bi-directional data communication between the information center and the navigation unit. The navigation unit comprises position sensor means for detecting a current position of the vehicle, previously driven route memory means for storing data indicating a previously driven route by the vehicle that comprises a series of the current position data detected by the position sensor means, and data transmission means for transmitting to the information center, via the communication means, the previously driven route data stored in the previously driven route memory means. The information center comprises a database storing road data, and new drive route discriminating means that operates, when the previously driven route data received from the navigation unit includes new drive route data not currently found in the current database, to update the database to include the new drive route data. In a preferred embodiment of this system, the new drive route discriminating means comprises new drive route memory means for storing the new drive route data as a candidate data when it is first transmitted from one navigation unit, comparing means for comparing another new drive route data transmitted from another navigation unit with the candidate data in the new drive route memory, and data entry means for entry of the new drive route data into the database only when the another new drive route data is substantially identical or at least similar to the candidate data so that both data are indicative of the same drive route.

In accordance with still another aspect of the present invention, there is provided a communicatory navigation system comprising an information center, at least one navigation unit each mounted on a vehicle and communication means for allowing bi-directional data communication between the information center and the navigation unit. The navigation unit comprises position sensor means for detecting a current position of the vehicle, a local database storing road data, new drive route discriminating means for determining if a route previously driven by the vehicle, that comprises a series of the current position data detected by the position sensor means, is already stored in the local database, new drive route memory means for storing data indicating the previously driven route when it is determined by the new drive route discriminating means that the previously driven route is not stored in the local database, and data transmission means for transmitting to the information center, via the communication means, the new drive route data stored in the new drive route memory means. The information center comprises a fundamental database storing road data, and new drive route discriminating means that operates in receiving of the new drive route data from the navigation unit to update the fundamental database to include the new drive route data.

In accordance with still another aspect of the present invention, there is provided a communicatory navigation system comprising an information center, at least one navigation unit each mounted on a vehicle and communication means for allowing bi-directional data communication between the information center and the navigation unit. The navigation unit comprises memory means for storing data indicating current conditions in and around the vehicle, output means for outputting necessary information to the driver and passengers in the vehicle, and data transmission means for transmitting the current condition data stored in the memory means to the information center via the communication means. The information center comprises a database storing road data, and drive condition discriminating means that statistically analyzes the current condition data received from the navigation unit, the result of which is send back to the navigation unit so that it may be output through the information output means. The current condition data may indicate operation of one or more instruments mounted on the vehicle selected from a group consisting of wipers, headlamps, ABS (anti-braking system), active suspension system and air-bag. The drive condition discriminating means determines current weather conditions, road surface conditions and traffic accidents in a specific area, in response to receiving substantially the same current condition data from a plurality of the vehicles in the specific area.

BRIEF DESCRIPTION OF THE DRAWINGS

Other objects and advantages of the present invention can be better understood from the following description when read in conjunction with the accompanying drawings in which:

FIG. 9 is an explanatory view showing an example of a previously driven route (Rs) of the vehicle that may be determined from the drive route history data supplied from the navigation unit mounted on the vehicle;

FIG. 10 is an explanatory view showing a bit map image (Bm) that is read out from the road map database in the center to have a rectangular area including the previously driven route (Rs) in FIG. 9, a road (K) shown by dotted lines as being already recognized in this area;

FIG. 11 is an explanatory view showing the bit map image (Bm) of FIG. 10 which is divided into (n)×(m) blocks;

FIG. 12 is an explanatory view showing the manner of encoding each block in the divided bit map image (Bm) of FIG. 11 to a digital value "0" or "1" indicating if there is any road data (that specifies a point on the existing road (K) shown by dotted lines) in each block;

DETAILED DESCRIPTION OF THE PREFERRED EMBODIMENTS

Figure 1:
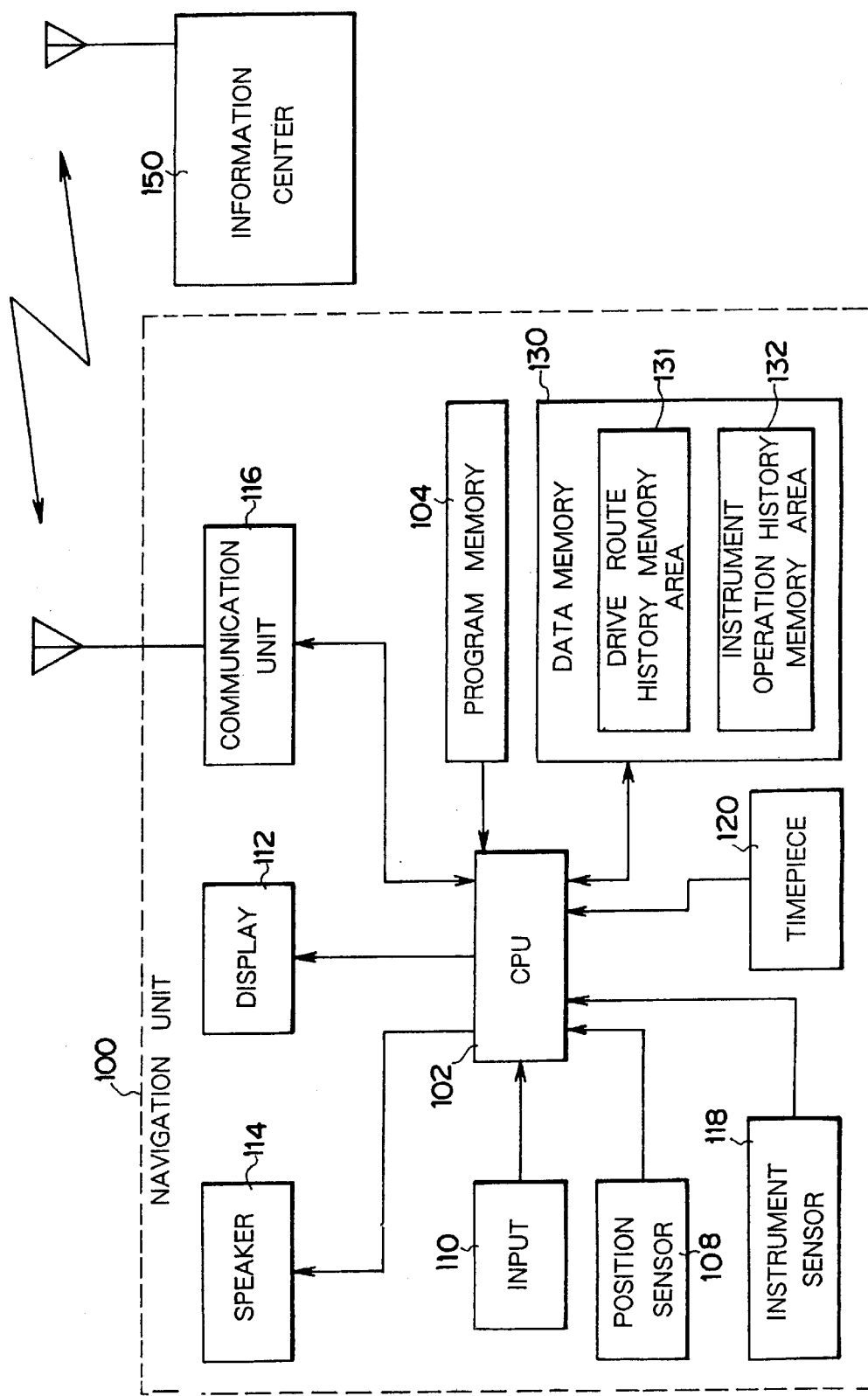
FIG. 1 is a block diagram showing a general and overall arrangement of a communicatory navigation system, in accordance with an embodiment of the present invention, comprising a plurality of navigation units (only one of which is shown therein) each mounted on a vehicle and each communicatably connected to an information center.

A navigation system embodying the present invention will be hereinbelow described with reference to the accompanying drawings. The system comprises a plurality of navigation units 100 mounted on each vehicle and an information center 150, as schematically shown in FIG. 1. Each navigation unit 100 and information center 150 communicate with each other by a bi-directional communication medium such as a telephone line. Thus, information center 150 is capable of controlling operation of navigation units 100 and, therefore, of controlling vehicles on which navigation units 100 communicatable with center 150 are respectively mounted.

Navigation unit 100 will operate as follows when in communication with information center 150:

1) It determines a current vehicle position and a destination position, which are supplied to information center 150, and receives drive route information from center 150, from which it produces suitable visible and/or audible guidance to guide the driver to drive along a drive route from the current position to the destination that has been determined at information center 150.

2) It outputs vehicle information to center 150 during a period of communication therebetween. The vehicle information includes a drive route history comprising a series of time-related vehicle passing position data and an instrument operation history indicating when and where a wiper or other instrument mounted on the vehicle is turned on and off. The term "period of communication" used hereinabove means a period from when a bi-directional communication (telephone communication, for example) is established between them to when the bi-directional communication is disconnected. In other words, the vehicle information may be output from navigation unit 100 to center 150 at any time while they are in communication with each other, even if no drive route information is actually supplied from center 150 at that time.

On the contrary, information center 150 will operate as follows when it is in communication with navigation device 100:

1) It receives from navigation unit 100 data representing the current vehicle position and the destination position to determine a recommended drive route from the current position to the destination, which will be sent back to navigation unit 100.

2) When receiving the drive route history from navigation unit 100, it determines if a road of the previously driven route is already stored in a predetermined map database. If not, it is additionally stored as new data to update the database.

3) When receiving the instrument operation history from navigation unit 100, it statistically operates to determine weather conditions and road conditions around the drive area. The determined weather and road conditions may be referred to in determination of the drive route. For example, when it is statistically known that it would rain in some area, center 150 can determine a drive route that does not pass through the rainy area.

Referring again to FIG. 1, navigation unit 100 has a central processing unit (CPU) 102 that operates in accordance with programs stored in a program memory 104 that is usually a ROM. Such programs may include a display control program by which a drive route and an area map, for example, are shown on a display 112 in response to the drive route information from information center 150, a voice control program by which voice guidance is produced from voice output unit or speaker 114, a communication control program by which the vehicle information (the drive route history, the instrument operation history) is automatically supplied to center 150 during the period of communication with center 150, etc.

A data memory 130, usually RAM, has at least a drive route history memory area 131 and an instrument operation history memory area 132. Drive route history memory area 131 stores a predetermined number of latest data indicating the latest vehicle positions detected by a position sensor 108 with time when the vehicle passes through the respective positions which is measured by a clock 120. The vehicle position is defined by its longitude and latitude. When a new data is given, the oldest data is deleted from memory area 131. Data in area 131 will represent the previously driven route of the vehicle. Instrument operation history memory area 132 stores data indicating operation of a vehicle instrument such as a wiper, each time some status change (typically, from OFF to ON and vice versa) of the instrument is detected by an instrument sensor 118. Data in area 132 is combined with time and place, that is, when and where such a status change happens, the former being detected by position sensor 108 and the latter by clock 120. Data memory 130 may further include a working area to be used for random access of necessary data in execution of a data processing operation by CPU 102, a drive route information memory area storing the drive route information from center 150, and an ID memory area storing ID data peculiar to the vehicle.

Position sensor 108 preferably comprises a combination of an absolute position sensor such as a GPS receiver and a relative position sensor such as a vehicle sensor and a direction finder. The relative position measured by the vehicle sensor and/or direction finder may be used to determine the vehicle position when the GPS receiver is unable to receive a signal from a satellite, especially when the vehicle is running through a tunnel or underpass. The relative position may also be used to correct the absolute position determined by the GPS receiver.

Input unit 110 may be a touch panel arranged on display 112, which allows input of information or command by a touch on a key or menu represented thereon. Another preferred example of input unit 110 is a voice input device with a microphone and voice recognizing software, through which necessary information or commands may be input by the operator's voice.

Display 112 may be a CRT display, liquid crystal display, a plasma display or a hologram device that projects a hologram onto a front glass of the vehicle.

Communication unit 116 is in practice a hand phone with a modem connected to the CPU and connected by commercial telephone lines with information center 150. However, communication unit 116 may be any one that is capable of transmitting and receiving data to and from information center 150 via any bi-directional telecommunication medium.

Instrument sensor 118 is mounted at any desired location to detect the status change of the vehicle instrument. By way of example, instrument sensor 118 comprises a wiper sensor detecting the current status (ON or OFF, wiper speed is high, low or intermittent) of a wiper, a headlamp sensor that detects the current status (ON or OFF) of headlamps, a temperature sensor that detects temperature outside and inside of the vehicle compartment, an ABS sensor that detects the current status (ON or OFF) of an ABS (anti-braking system), a transmission sensor that detects the current transmission speed, an active suspension sensor that detects the current status of an active suspension system, and an air-bag sensor that detects the status (open or closed) of an airbag. The status change of some instrument detected by instrument sensor 118 is stored in instrument operation history memory area 132, together with time and place of occurrence of the status change.

Figure 2:
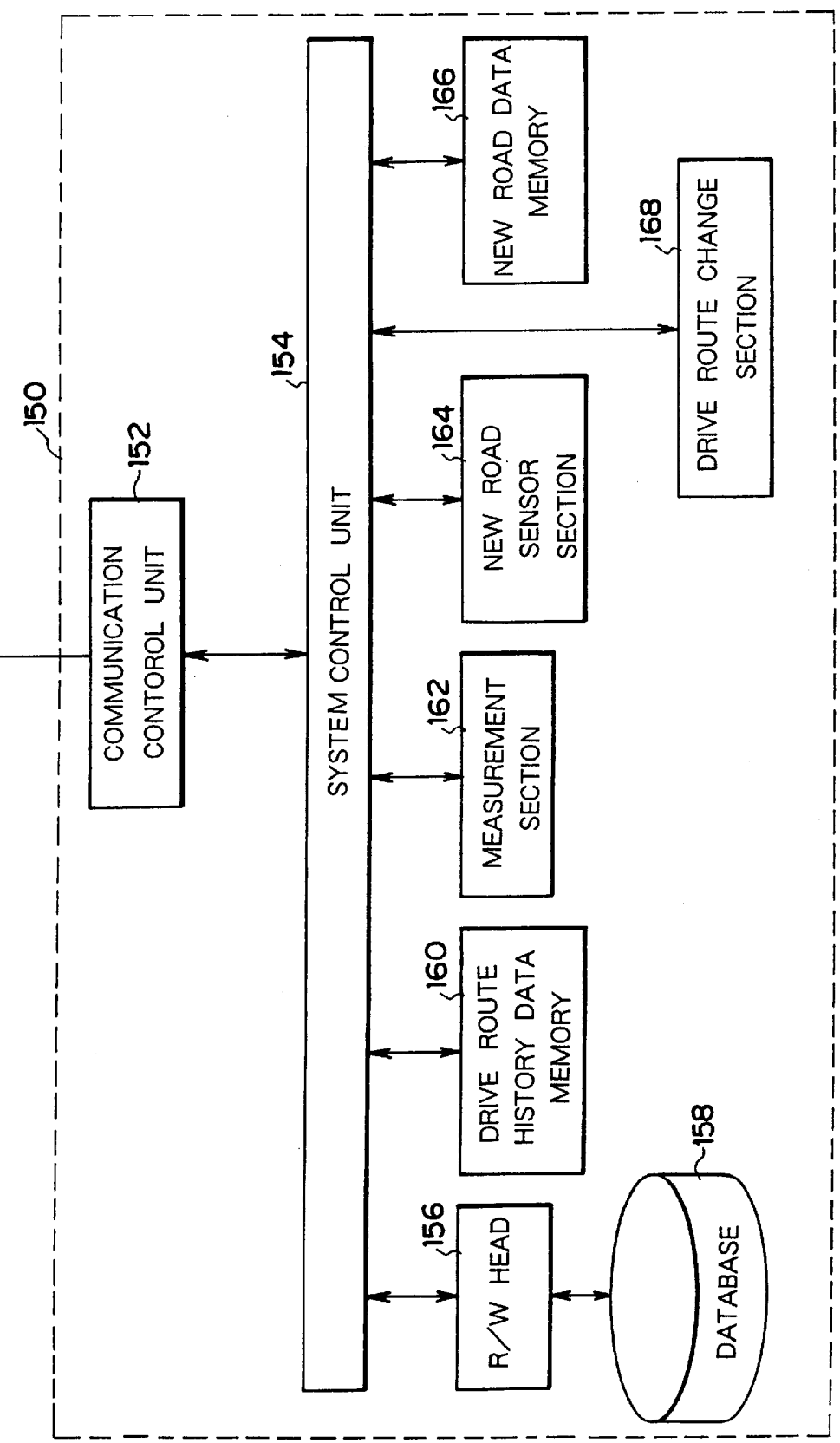
FIG. 2 is a block diagram of the information center.

Specifically referring now to FIG. 2, information center 150 has a communication control unit 152 such as a modem and terminal adapter which is connected with a system control unit 154 and enables data transmission between navigation device 100 and center 150 through bi-directional communication media or telephone lines.

System control unit 154 includes a central processing unit (CPU), a program memory or ROM storing programs to be executed by the CPU and a RAM to be used as a working memory when the CPU performs a control operation in accordance with the program in ROM, though these elements are not shown in FIG. 2. The programs by which the CPU of system control unit 154 operates will include a drive route finding program, a program for determining a specific drive route to be supplied to navigation system 100 mounted on the vehicle, a discrimination program for determining if a road of the drive route history supplied from navigation unit 100 is already stored in a road map database 158, and a statistical program for statistically analyzing the instrument operation history from navigation unit 100. Database control unit 156 may comprise a known data reading/writing head for reading and writing data into and from database 158 in response to a command from CPU of system control unit 154.

Database 158 should preferably be a hard disc drive or other memory device having great memory capacity, storing drive route finding data, drive route guidance data and destination specifying data. The drive route finding data and the drive route guidance data are known in conventional navigation systems. The destination specifying data represents public agencies, hotels, hospitals, freeway interchanges, railway stations, golf courses and other famous institutions and installations in the form of their telephone numbers and addresses. Accordingly, in response to a specific telephone number or address transmitted from navigation unit 100, a specific position designated by the telephone number or address may be read out from database 158. Database 158 is also provided with a memory area for storing the new road data and another memory area for storing the results of statistical operation by system control unit 154.

A drive route history data memory 160 stores the drive route history data of each vehicle. A measurement section 162 measures the time required to drive between two specific points by calculation from the time data at these positions stored in the drive route history data memory 160. Measurement section 162 also calculates the average speed between these two points. The calculated data indicative of a traffic jam is signaled to navigation unit 100 together with the drive route information.

A new road sensor section 164 determines if a road of the drive route history supplied from navigation unit 100 is included in database 158. If not, data of this road is send to a new road data memory 166 and stored therein. Memory 166 stores the new road data in combination with ID of the vehicle from which the new road data is supplied. Similar new road data may be given from navigation units 100 of different vehicles. When receiving some new road data, new road sensor 164 further determines if identical or similar data has already been stored in memory 166. If this is the case, sensor 164 determines that this road is truly a road that may be a drive route and commands that the road map data in database 158 should be updated to include this road. Determination of identicalness or similarity of the new road data may be done by comparison between their coordinates (longitude and latitude) of points thereon that are detected by position sensor 108 in navigation unit 100. Update of database 158 may be done after inquiries to the competent authorities to confirm that the new road has recently been constructed.

A drive route change section 168 is provided to revise conditions for searching the drive route when a drive route to be determined upon usual conditions would not be recommended in a particular case. More particularly, when determining an optimum drive route in response to the current position and the destination, both having been detected and designated in navigation unit 100 of a specific vehicle, drive route change section 168 further considers dynamic parameters that may have a great influence on the time period actually required to drive along a particular drive route. Such dynamic parameters may be occasional, accidental or seasonal and can be inferred from the past data obtained from a vehicle other than the particular vehicle that needs a drive route. For example, where the latest time period required for driving between two positions that has been measured by measurement section 162 is proved to be extremely long, which would suggest a heavy traffic jam currently on a road therebetween, the route-finding conditions may be changed so that another drive route bypassing the jammed section to a destination beyond is determined and supplied to navigation unit 100 of a vehicle not yet entering the jammed section.

Data transmission or communication between navigation unit 100 and information center 150 will be hereinbelow described in more detail with reference to the data flowchart of FIG. 3. At S200, a telephone number or address of a destination is input through a touch panel or voice input device of input unit 110. The telephone number or address of the destination thus input is stored in a transmission buffer (not shown), in combination with the current vehicle position and the vehicle ID.

When the user turns on a switch (not shown), communication unit 116 automatically operates to call center 150 so that navigation unit 100 comes into communication with center 150, at S202. A telephone number of center 150 is preset in communication unit 116. When center 150 makes an answer back signal through the telephone line, a communication flag in navigation unit 100 is turned on, which indicates that a period of communication has started.

Then, at S204, a "request" is supplied to center 150. The "request" means a command that requests a drive route from the current position to the destination to be determined by center 150. In this embodiment, when the communication flag is turned on, data stored in the transmission buffer is read out and supplied to center 150.

Center 150 receives the request at S206 and reads out corresponding position data of the destination from database 158 at S208. Then, based on the current vehicle position and the destination position, it plans a recommended drive route therebetween. The planned drive route is transmitted to the vehicle from which the request was given, which can be recognized by the inherent vehicle ID, at S210. Navigation unit 100 of the vehicle is disconnected from center 150 after receiving the drive route information, at S212. When center 150 plans and transmits plural drive routes, navigation unit 100 should be disconnected after receiving all of the drive route information from center 150. In the example shown in FIG. 3, navigation unit 100 receives information for two drive routes. Once navigation unit 100 is disconnected from center 150, the communication flag is turned off, indicating that the period of communication is over.

Figure 3:
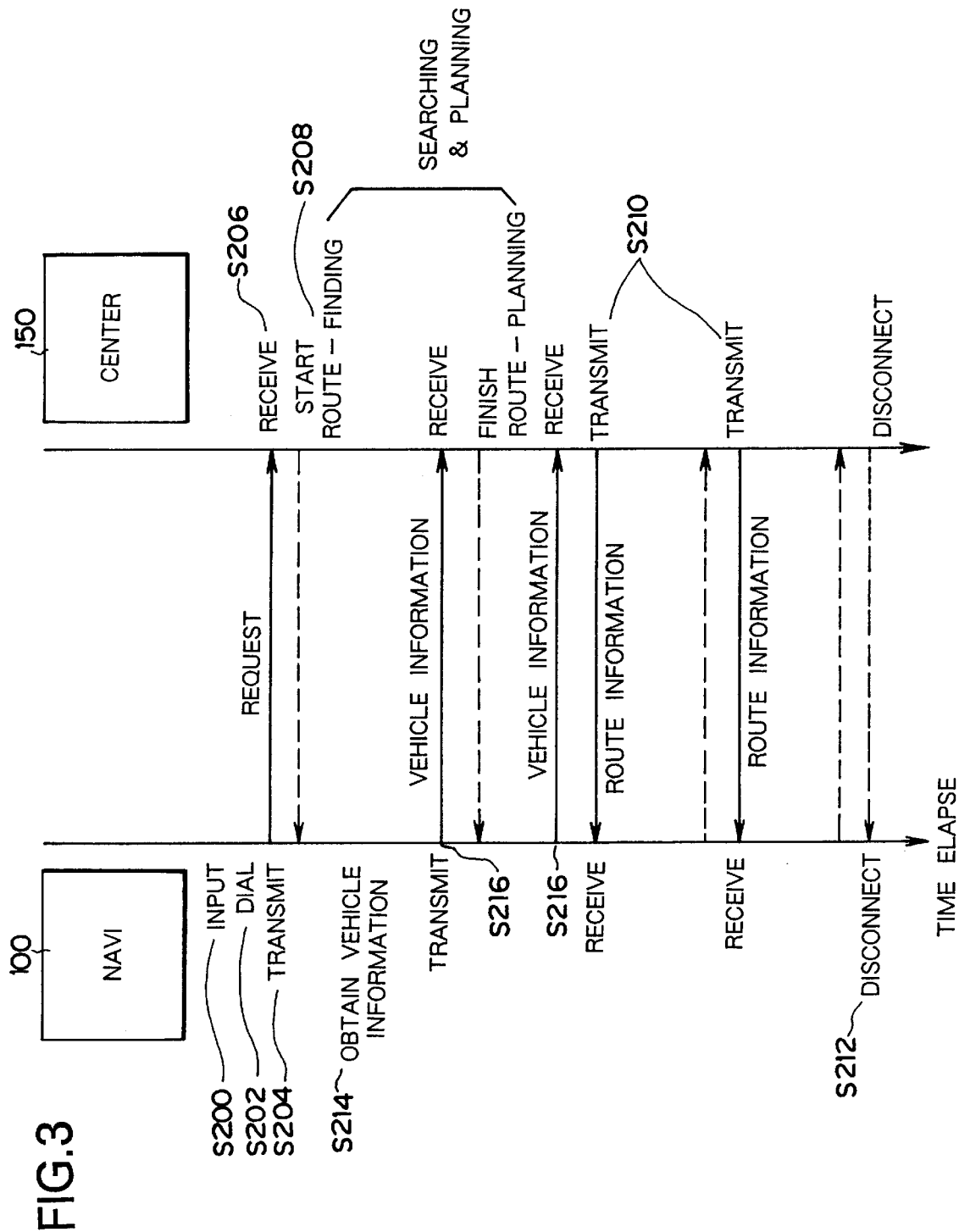
FIG. 3 is a data flowchart explaining data transmission between the navigation unit and the center.
Figure 4:
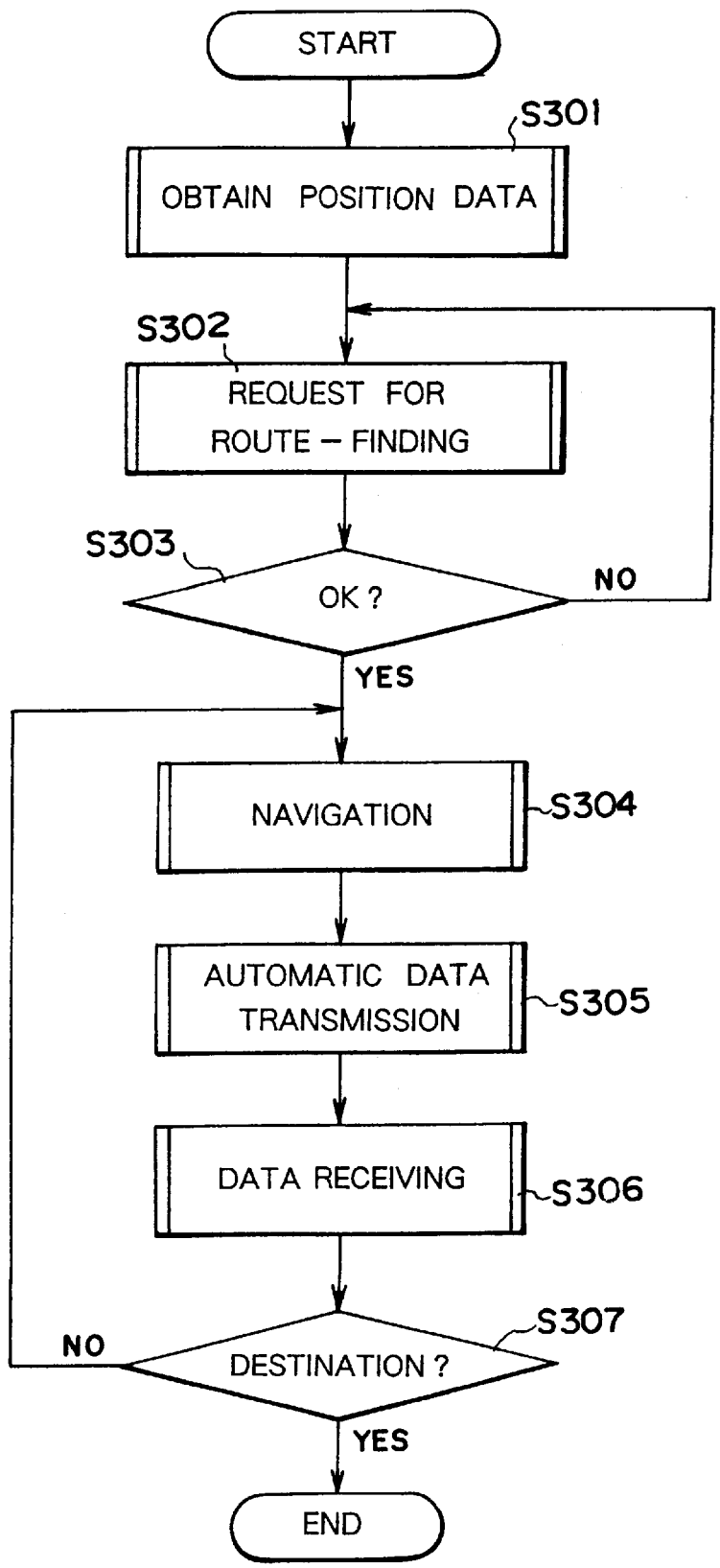
FIG. 4 is a flowchart showing a main routine executed by the navigation unit for drive route navigation from the current position to the destination, including data transmission and receiving steps.

FIG. 4 is a flowchart showing the main routine for the program executed by navigation unit 100 to provide for navigation from the current position to the destination. Navigation unit 100 obtains the current vehicle position data and the destination position data at S301, and then transmits the "request" (FIG. 3) through communication unit 116, via telephone line, to center 150 at S302. In response to receiving the request, center 150 recommends a drive route from the current position to the destination and sends this back to navigation unit 100. Navigation unit 100 confirms that the drive route now received from center 150 is acceptable at S303. If not, it again outputs the request to center 150. If the drive route is acceptable, it then executes navigation at S304 where drive route guidance is output through display 112 and/or speaker 114 in a known manner. Then, at S305, the drive information including the drive route history data in memory area 131 and the instrument operation history data in memory area 132 is automatically transmitted to center 150 during spare time within a period of communication between navigation unit 100 and center 150 as has been described with reference to FIG. 3. When other data (for example, the result of statistical analysis of the drive condition which will be described with reference to the flowchart of FIG. 17) is transmitted from center 150, navigation unit 100 receives the same at S306. These successive procedures are repeated until the vehicle reaches the destination (Yes at S307).

Figure 5:
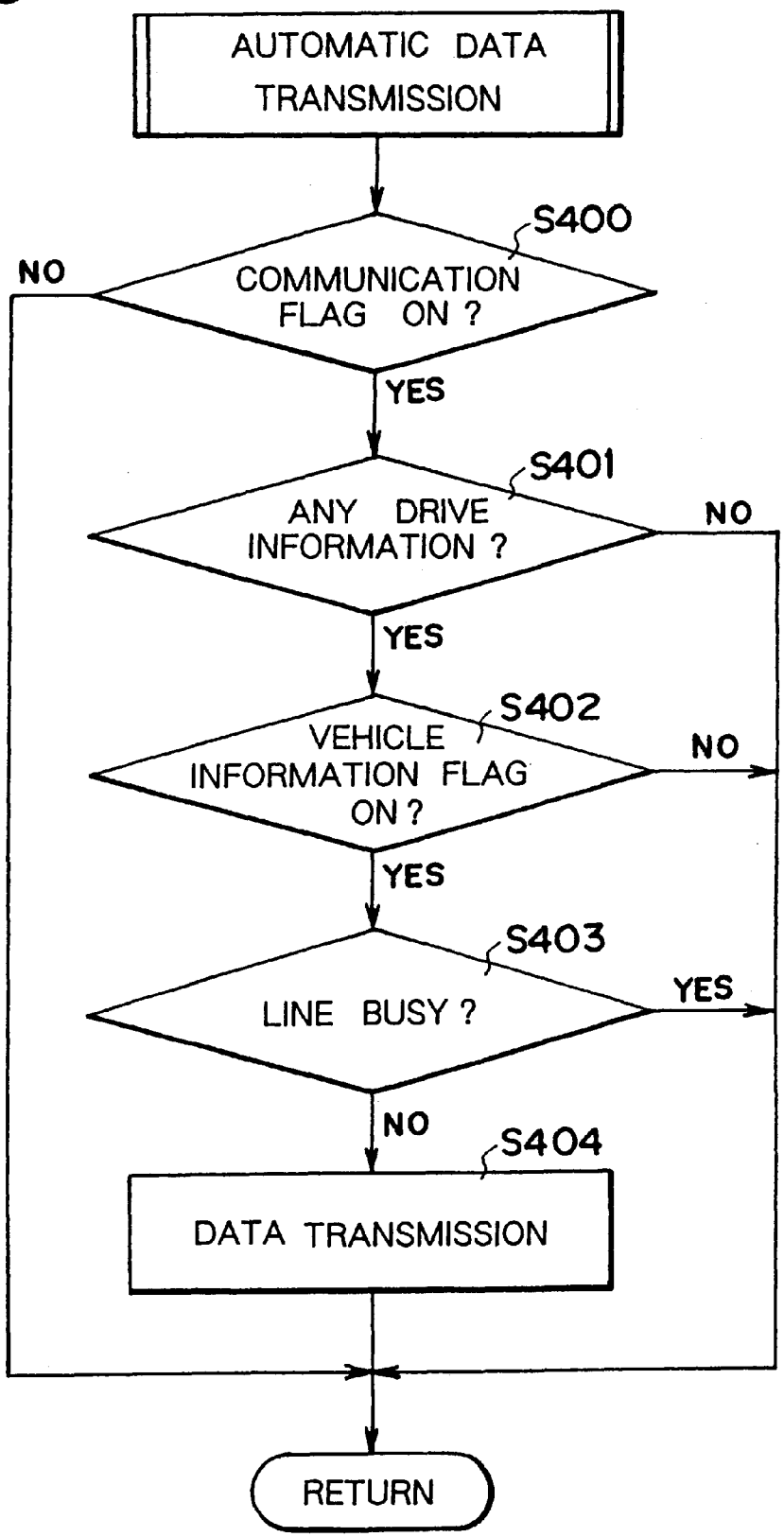
FIG. 5 is a flowchart showing a sub-routine for the automatic data transmission executed by the navigation unit.

The automatic data transmission at S305 of the flowchart of FIG. 4 will now be described with reference to the flowchart of FIG. 5. At S400, navigation unit 100 confirms the current status of the communication flag. When confirming the communication flag is ON, it then determines at S401 if any drive information is stored in data memory 130. If any drive information is stored in either one of memory areas 131 and 132 of data memory 130 (Yes at S401), it then confirms at S402 the status of a vehicle information flag which indicates whether or not the vehicle information is transmittable from navigation unit 100 to center 150. The vehicle information flag is turned on or off by the user. When the flag is ON (Yes at S402), it is then determined at S403 If the request is now being supplied from navigation unit 100 to center 150. When the line is busy (Yes at S403), the procedure is returned to S400, which means that actual transmission of the vehicle information is suspended until transmission of the request is completed. Otherwise (No at S403), the vehicle information stored in data memory 130 is automatically and immediately sent to center 150 via the telephone line, at S404. In FIG. 3, the vehicle information is transmitted twice from navigation unit 100 at S216.

In the example shown in FIG. 3, navigation unit 100 transmits the request first and then the vehicle information. Yet, the vehicle information may be transmitted at any time during the period of communication, or in other words while the communication flag in the navigation unit 100 is ON, provided that the communication or telephone line is not busy. To prevent any jamming problem which might arise in communication between navigation unit 100 and center 150, in a preferred embodiment, the vehicle information is transmittable from navigation unit 100 to center 150 during a part of the period of communication. Such a limited period, for example, starts with the period of communication (namely at the same time when navigation unit 100 becomes communicatably connected to center 150) and ends with start of transmission of the drive route information or any other data from center 150. Another example of such a limited period starts when data transmission from center 150 is completed and ends at the same time when the period of communication ends (namely the communication line or telephone line between navigation unit 100 and center 150 is disconnected). In still another example, transmission of the vehicle information may be done after completion of transmission of first drive route information from center 150 but before center 150 begins transmission of information for another drive route. In summary, it is preferable that automatic transmission of the drive information from navigation unit 100 to center 150 is achieved during spare time or a vacant period within the period of communication therebetween.

In a preferred embodiment, navigation unit 100 transmits the vehicle ID code, the drive route history data in memory area 131, the instrument operation history data in memory area 132 and the current time data in succession, at predetermined time interval (t1). The drive route history data comprises a series of the vehicle position data that is detected by position sensor 104 at predetermined time interval (t2), smaller than (t1), combined with data indicating when each vehicle position is detected. The instrument operation history data comprises a series of combination of data indicating the status change of some instrument (accessory) and time data indicating when each status change is detected. Both the time-related vehicle position data and the time-related instrument status change data are stored respectively in memory areas 131 and 132 in data memory 130 at interval (t2) after the last time of transmission of these data was made at (T1). When time (t1) passes since (T1), all data which has been stored in memory areas 131 and 132 is transmitted to the center 150 as the drive route history data and the instrument operation history data. In practice, when the vehicle position detected at (T2) Is within a predetermined short distance from the last vehicle position detected at (T2-t2), the time-related position data may not be stored in memory area 131.

Figure 6:
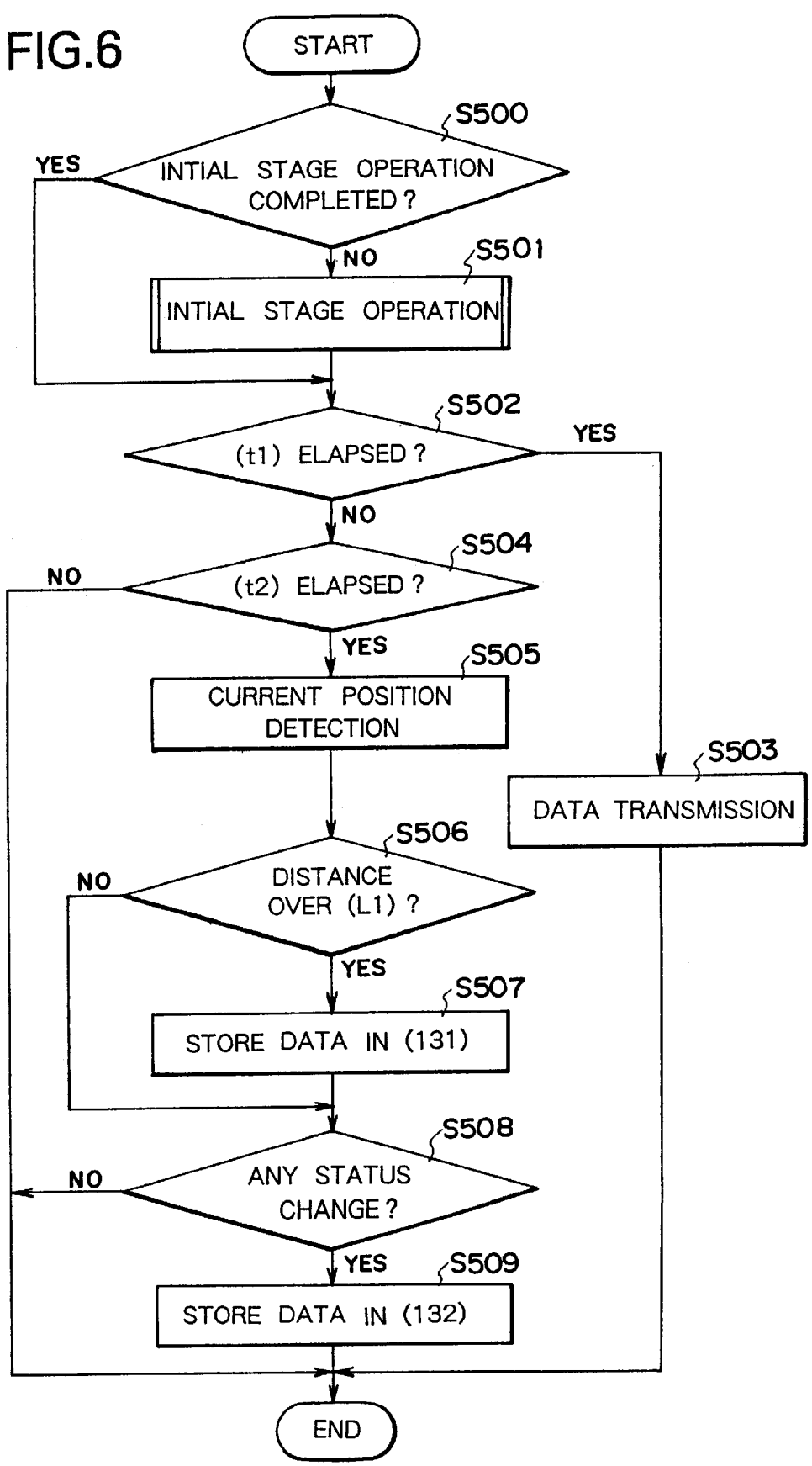
FIG. 6 is a flowchart showing the automatic data transmission procedure in relation to entry of the drive route history data and the instrument operation history data in respective memory areas in data memory.

FIG. 6 is a flowchart showing the above-described embodiment of the automatic data transmission at S305 of the flowchart of FIG. 4. At S500, it is determined if an initial stage operation has been completed. If not, the initial stage operation is carried out at S501. The initial stage operation includes first transmission of the initial drive information at the time of starting the operation. The initial stage operation is carried out also when the vehicle is not moved beyond the predetermined distance between two detections.

When the initial stage operation has been completed (Yes at S500), it is then determined at S502 if a predetermined time interval (t1) has elapsed since the last time of transmission of the drive information from navigation unit 100 to center 150. If this is the case (Yes at S502), all the data that has been stored and accumulated in memory areas 131 and 132 is transmittable to center 150, at S503. Whether or not these data are actually transmitted as the drive route history data and the instrument operation history data will depend upon the result of the automatic transmission control procedure in accordance with the flowchart of FIG. 5.

If time (t1) has not yet elapsed since the last time of transmission (No at S502), it is then determined at S503 if another predetermined time interval (t2) has elapsed since the last time vehicle position was detected. If this is the case (Yes at S503), the current vehicle position is detected at S505. Then, at S506, it is determined if the current position detected at S505 is beyond a predetermined distance (L1) from the last position. Only when the vehicle moves over the distance (L1), the detected position data with time is stored in memory area 131, at S507. It is then determined at S508 if there is some status change of a specific instrument (accessory) during the period (t2) since the last time of detection. If any, such data with time is stored in memory area 132, at S509. The status change data to be stored in memory area 132 includes, for example, ON/OFF of a wiper, ON/OFF of headlamps, change of information from GPS, drastic increase or decrease of the vehicle speed, outside temperature change, transmission speed change, change of operating condition of ABS, airbags, active suspension system, etc.

In the manner described above, data is stored in each of memory areas 131 and 132 at every (t2) interval and is accumulated to form the drive route history data and the instrument operation history data, respectively, which are included in the drive information to be transmitted at every (t1) interval to the center 150.

Figure 7:
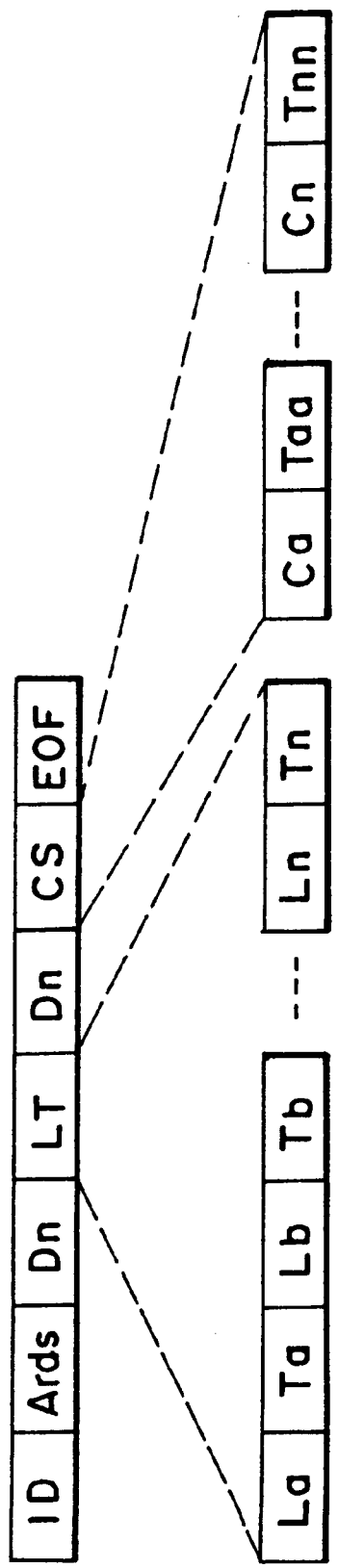
FIG. 7 is an explanatory view showing an example of formatted data to be transmitted from the navigation unit to the center.

The vehicle information to be transmitted to center 150 is formatted as shown in FIG. 7 by way of example. It stores the vehicle ID in a data field indicated by "ID", the address data of center 150 in an "Ards" field, a series of the drive route history data in an "LT" field preceded by a "Dn" field storing the number of said data, a series of the instrument operation history data in a "CS" field preceded by a "Dn" field storing the number of said data, and the last data field "EOF" indicates the end of data records. As described before, a series of the drive route history data comprises a series of time-position relational data that, in turn, comprises position data Ln (n=a, b, c, . . . ) and time data Tn (n=a, b, c, . . . ) indicating when the vehicle passed through the respective position. A series of the instrument operation data comprises a series of combination of data Cn (n=a, b, c, . . . ) representing the status change of various instruments (ON and OFF of a wiper, headlamps, for example) and time data Tnn (nn=aa, bb, cc, . . . ) indicating when the status change is observed.

Figure 8:
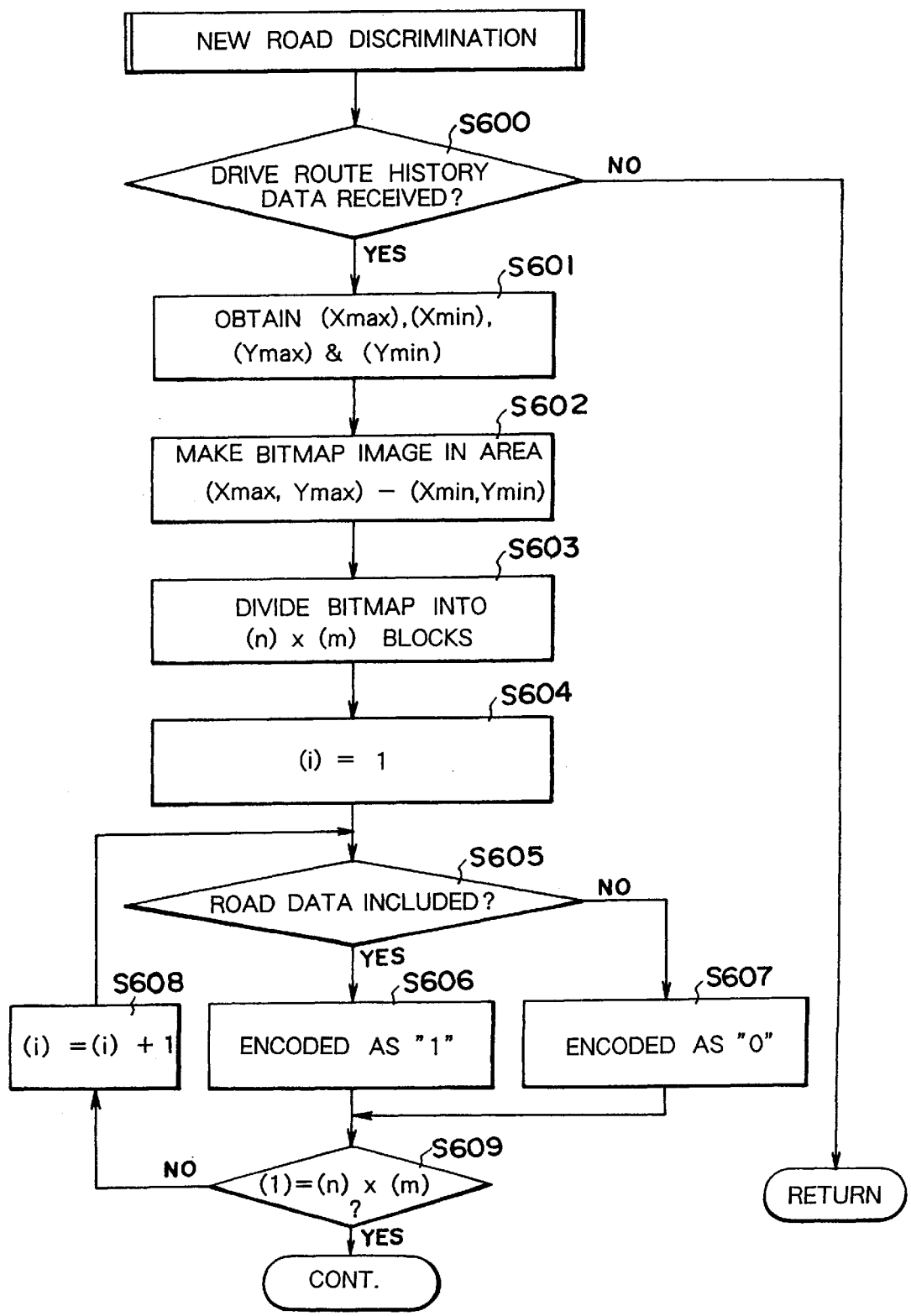
FIG. 8 is a flowchart showing a routine for the new road discrimination executed by the center in response to receiving the drive information including the drive route history data.

When receiving the vehicle information from navigation unit 100, center 150 determines if there is any road or drive route that is included in the vehicle information but not found in database 158. This procedure may be in accordance with the flowchart of FIG. 8. When it is confirmed at S600 that the vehicle information includes some drive route history data, it analyzes the drive route history data in the vehicle information to recognize a predetermined length of the previous drive route, at S601. More particularly, it picks up maximum longitude (Xmax), maximum latitude (Ymax), minimum longitude (Xmin) and minimum latitude (Ymin) for the previous drive route. FIG. 9 shows an example of the previous drive route (Rs) in which the respective points to be picked up at S601 are also shown. Then, at S602, road map data of a rectangular area defined by the maximum coordinates (Xmax, Ymax) and the minimum coordinates (Xmin, Ymin) is read out from database 158 to make its bit map image (Bm), an example of which is shown in FIG. 10. The bit map image (Bm) includes a road (K), indicated by dotted lines in FIG. 10, which is already stored in database 158. The bit map image area is divided into plural blocks by (n) in longitude and (m) in latitude, at S1016, as shown in FIG. 11. Center 150 then operates at steps S604–S609 to encode the respective blocks in the bit map image (Bm) as "0" or "1". Any block including the road data is encoded as "1" at S606, whereas one including no road data is encoded as "0" at S607, as shown in FIG. 12. Such encoding operation is repeated successively with respect to the first to the last blocks by increasing, one by one, a counter value (i) from the initial value "1" (set at S604) to "(n)×(m)", at S608.

After all blocks have been encoded as "0" or "1" (Yes at S609), then, center 150 operates at steps S61 0-5615 to determine if the previous drive route (Rs) contains new road data. More specifically, at S611, it is determined if a block containing the (j)th position data of the past drive route (Rs) is encoded "0" at S606 or "1" at S607. When the result of the determination at S611 is "1", it means that the position data is located along or near the existing road (k). In this case, accordingly, there is no need to newly store the said position data in database 158. On the other hand, if the result of the determination at S611 is "0" it suggests that the position data is offset from any existing road, so that this data is then stored in memory 166 as a candidate data for a new road, together with the vehicle ID from which the previous drive route (Rs) is received, at S612. Such determination is repeated successively with respect to the first to the last position data of the previous drive route (Rs) by increasing, one by one, a counter value (j) from "1" (set at S610) to the last position data. Thus, a series of the candidate position data would suggest a new road not existing in the current database 158. In the example shown in FIGS. 9–12, the first position data of the previous drive route (Rs) is already stored as the starting point of the existing road (k) but the second and following position data of the previous drive route (Rs) are all stored in memory 166 as the candidate data which suggests a new road (Rs).

In a preferred embodiment, from the candidate new road data in memory 166, center 150 determines if such road data should be added to database 158. In summary, database 158 is updated to include the new road data only when identical or similar data supplied from another vehicle have already been stored in memory 166. This will be described with reference to some examples shown in FIGS. 13–15.

Figure 13:
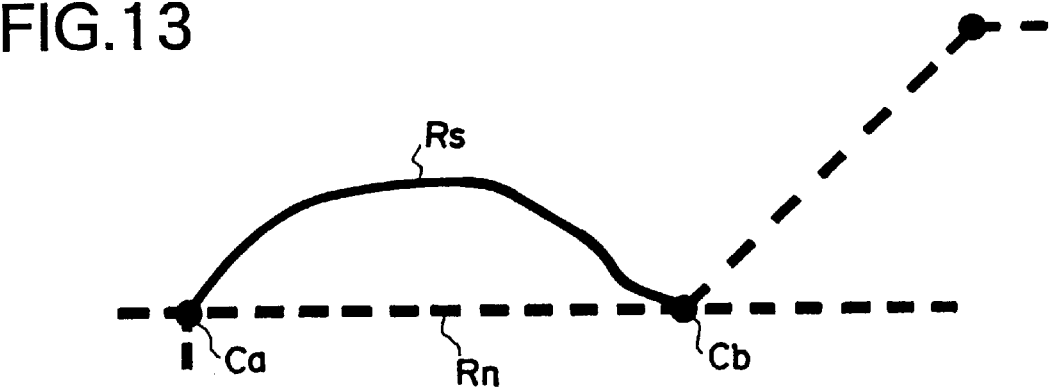
FIGS. 13–15 are explanatory views showing examples of the actual previously driven routes (Rs), shown by solid lines, depicted by the candidate new road data, together with the existing road (Rn) already stored in the database in the center.

In the example of FIG. 13, the actual drive route (Rs) indicated by a solid line is depicted by the candidate new road data now entering memory 166. This example shows that the vehicle runs from a crossing (Ca) to another crossing (b), both data have been stored in database 158, but along the route (Rs) that has no data in database 158 and is offset from the route (Rn) already stored in database 158. In this case, center 150 determines if memory 166 already has data identical or similar to the new road data of the route (Rs) in new road memory 166. Only if such identical or similar data is found in the current new road memory 166, database 158 is updated to include the drive route (Rs) as a newly recognized route with its identification number and opposite end data (Ca) and (Cb).

Figure 14:
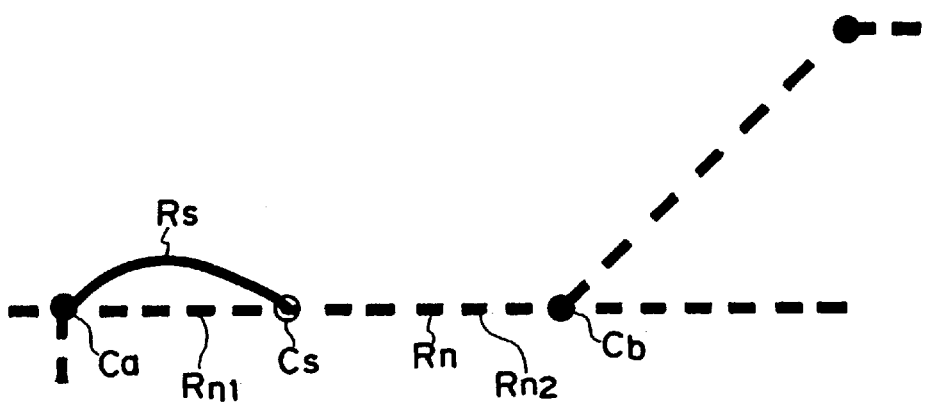

FIG. 14 shows another example in which the actual drive route (Rs) extends from a crossing (Ca) already stored as one end of the existing route (Rn) but does not follow the existing (stored) route (Rn). Also, the end point (Cs) of (Rs) does not coincide with the other end of route (Rn) which is stored in database 158 as having opposite end data (Ca) and (Cb). In this case, center 150 also determines if memory 166 already has data identical or similar to the new road data of the route (Rs) in new road memory 166. Only if such identical or similar data is found in the current new road memory 166, database 158 is updated to include the drive route (Rs) as a newly recognized route with its identification number and opposite end data (Ca) and (Cs). Also, database 158 is updated such that the previous route (Rn) is divided into two sections (Rn1) and (Rn2), the former being defined between (Ca) and (Cs) and the latter between (Cs) and (Cb).

Figure 15:
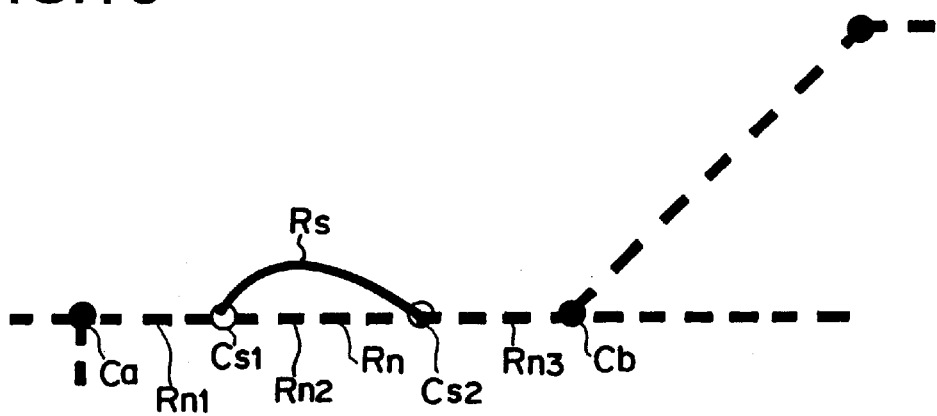

FIG. 15 shows still another example in which the newly recognized drive route (Rs) has the opposite ends (Cs1) and (Cs2) located on the existing route (Rn) but not stored as the opposite end data thereof. In this case, provided that identical or similar data has already been stored in memory 166, database 158 is updated to include the drive route (Rs) as a new route with its identification number and opposite end data (Cs1) and (Cs2). Also, database 158 is updated such that the previous route (Rn) is divided into a first section (Rn1) defined between (Ca) and (Cs1), a second section (Rn2) between (Cs1) and (Cs2) which extends in parallel with the new route (Rs), and a third and last section (Rn3) between (Cs2) and (Cb).

Figure 16:
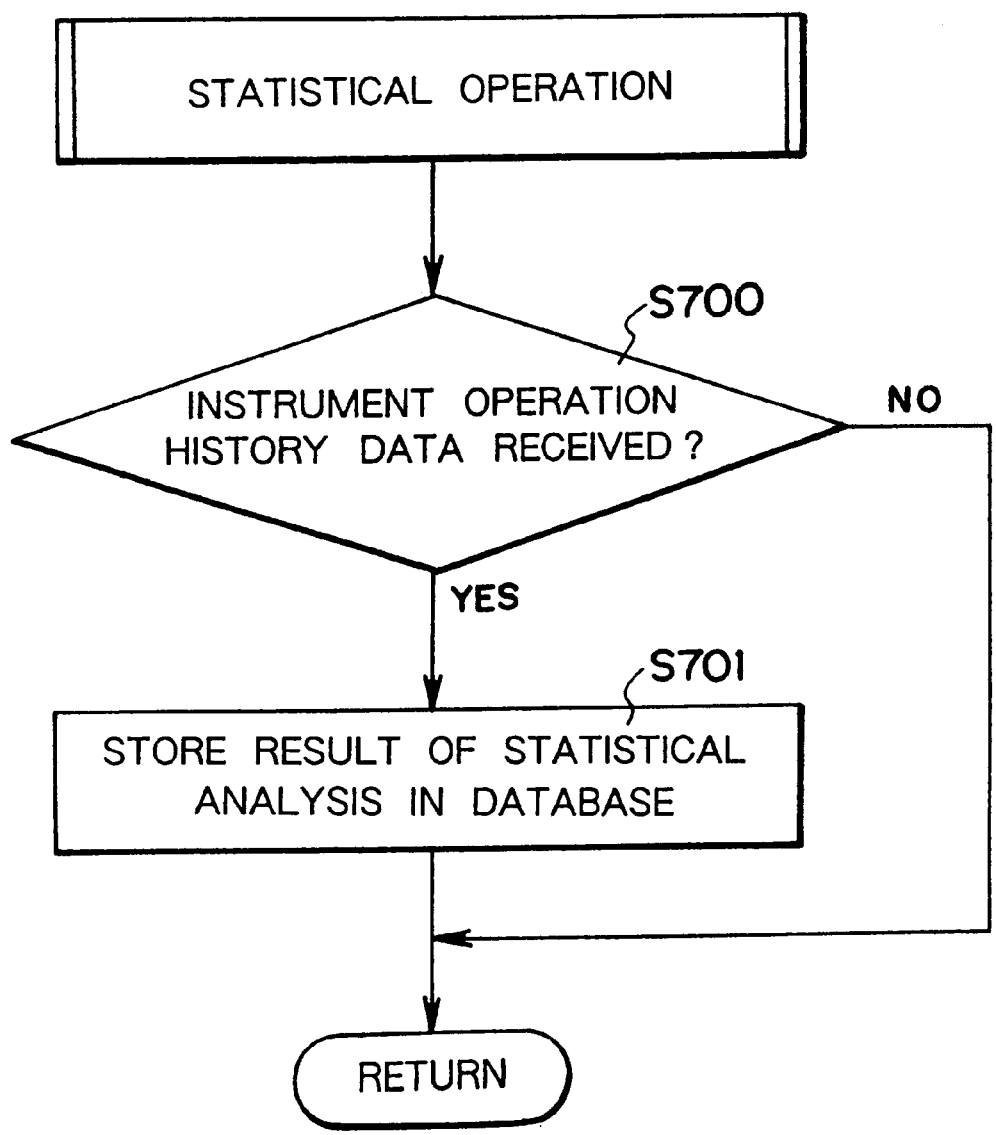
FIG. 16 is a flowchart showing a routine for statistical operation executed by the center, which is applied when some instrument operation history data is included in the drive information that the center receives from the navigation unit.

FIG. 16 is a flowchart of a routine to be executed when the drive information that center 150 receives from navigation unit 100 from some vehicle includes instrument operation history data. After confirming at S700 that the instrument operation history data is received, center 150 statistically analyzes the data and stores the result of statistical analysis in database 158, at S701. Some examples of statistical analysis executed at S701 will be given hereinbelow.

(i) When center 150 receives the instrument operation history data indicating that a wiper switch is ON, from plural vehicles in a restricted area, data indicating that it is raining in that area is stored in database 158.

(ii) When the instrument operation history data indicates intermittent mode of operation of the wiper by plural vehicles in a restricted area, data suggesting that it is only drizzling in that area is stored in database. When, on the other hand, there are many data indicating that the wiper moves fast, a heavy rainfall is inferred.

(iii) When instrument operation history data indicates use of headlamps for plural vehicles in a restricted area in the daytime, it may be inferred that the driver's sight distance is extremely limited due to dense fog, for example, in that area, which is stored in database 158. Daytime or nighttime may also be judged from time data contained in the instrument operation history data.

(iv) When the instrument operation history data indicates outside temperature for plural vehicles in a restricted area, that data is statically analyzed to obtain the average temperature in that area, which is stored in database 158.

(v) When the instrument operation history data indicates operation of ABS or active suspension system by plural vehicles in a restricted area, the driver is cautioned against speeding, which data is stored in database 158.

(vi) When center 150 receives the instrument operation history data which indicates that an airbag has just opened in one or more vehicles, data suggesting occurrence of a serious traffic accident is stored in database 158.

These data items are each stored in database 158 together with the number identifying the relevant area or location. The data may be further combined with the latest time of receiving the instrument operation history data.

In a preferred embodiment, data stored in database 158 is referred to in determination of the drive route by center 150. More particularly, in response to receipt of the request (FIG. 3), center 150 determines the drive route from the current position to the destination with further reference to data stored in database 158 which indicates the weather conditions, temperature, road surface conditions, traffic accidents, etc., in some area or location. Accordingly, it becomes possible to determine a "best" drive route in a particular situation. For example, when data suggesting occurrence of a traffic accident is stored in database 158, center 150 makes a drive route plan that bypasses the traffic accident. When data in database 158 suggests a snowfall in some area from wiper operation and extremely low temperature, a drive route not passing through that area would be recommended. Such operation is carried out by drive route change section 168 (FIG. 2). When the instrument operation history data includes a fuel remainder and center 150 is aware that the fuel tank is almost empty, a drive route plan calling for a stop at the nearest fuel station may be formulated.

The result of statistical analysis indicating the drive condition information regarding the weather conditions, temperature, road surface condition, traffic accidents, etc., may be included in the drive route information to be supplied to navigation unit 100. For example, if the drive route information includes data indicating that it is raining in a specific area, in response to such data, navigation unit 100 may control display 112 such that an umbrella symbol is represented in a relevant area in the displayed map. This information may also be output through speaker 14.

Figure 17:
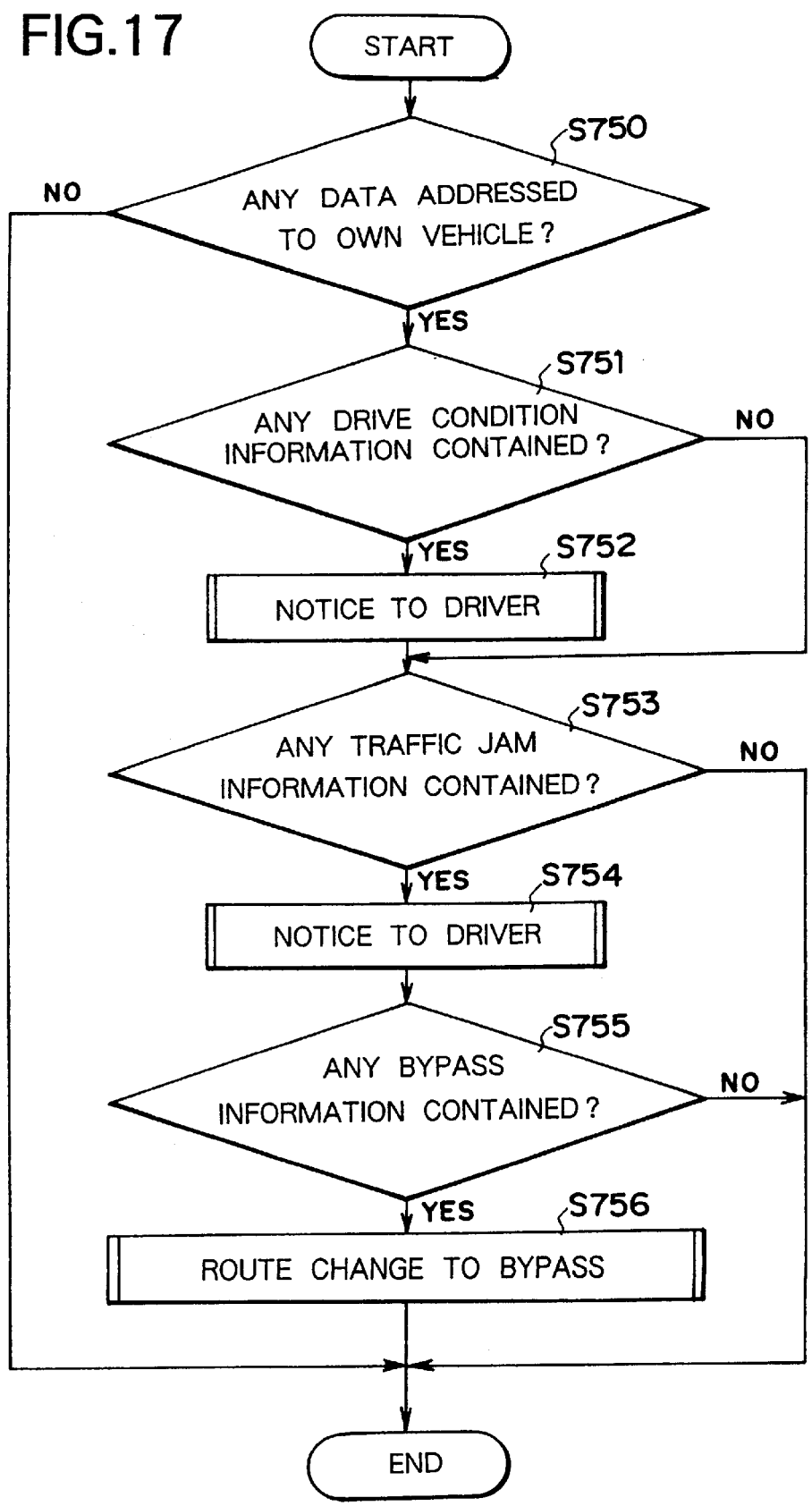
FIG. 17 is a flowchart showing a sub-routine for the data receiving step in the flowchart of FIG. 4 executed by the navigation unit when it receives the drive route information from the center.

FIG. 17 is a flowchart of a routine to be executed when navigation unit 100 receives the drive route information from center 150. After confirming at S750 that the drive route information from center 150 has been received, navigation unit 100 determines at S751 if there is any drive condition information contained in the drive route information. If any (Yes at S751), this is noticed to the driver via display 112 and/or speaker 114 at S752. It then determines at S753 if there is any traffic jam information contained in the drive route information. If any traffic jam is anticipated ahead of the current position (Yes at S753), this is noticed to the driver via display 112 and/or speaker 114 at S754. If there is data suggesting another route bypassing the traffic jam point (Yes at S755), navigation unit 100 changes the current drive route to a bypass route at S756. This procedure illustrated by the flowchart of FIG. 17 is performed as the data receiving step at S306 in the routine of the flowchart of FIG. 4.

The drive route history data and the instrument operation history data both contained in the drive information from navigation units 100 of plural vehicles are stored and accumulated in database 158. Center 150 analyzes the accumulated drive route history data to determine the number of vehicles running along a predetermined route and the average speed thereof. The result is used as an index of traffic jam (K), which is represented by the equation $K=A*(N/V)$ where A is a constant, N the number of vehicles in a route and V the average vehicle speed during travel of the route. Center 150 also analyzes the accumulated instrument operation history data to obtain necessary drive condition information regarding the weather conditions, road surface condition, and traffic accidents, for example. From the traffic jam index (K) and the drive condition information thus obtained, center 150 determines a drive route that is most suitable for the vehicle, and sends this to navigation unit 100 mounted thereon. A similar procedure may also be executed when the vehicle is actually running along a preselected drive route. More particularly, when a drastic change in the drive conditions arises which would be a bar to continued driving along the current drive route, this fact is made known to the vehicle and, if possible, center 150 plans a bypass drive route that can obviate troubles and transmits the same to navigation unit 100 of the same vehicle. The proposed bypass drive route starts at a branch point or crossing ahead of the current position.

In accordance with the foregoing embodiment, determination of a drive route not only depends upon the fixed road map data but also relies upon situational parameters that may change case by case, season by season and vehicle by vehicle. Therefore, any vehicle may always obtain a most preferred drive route from center 150.

Figure 18:
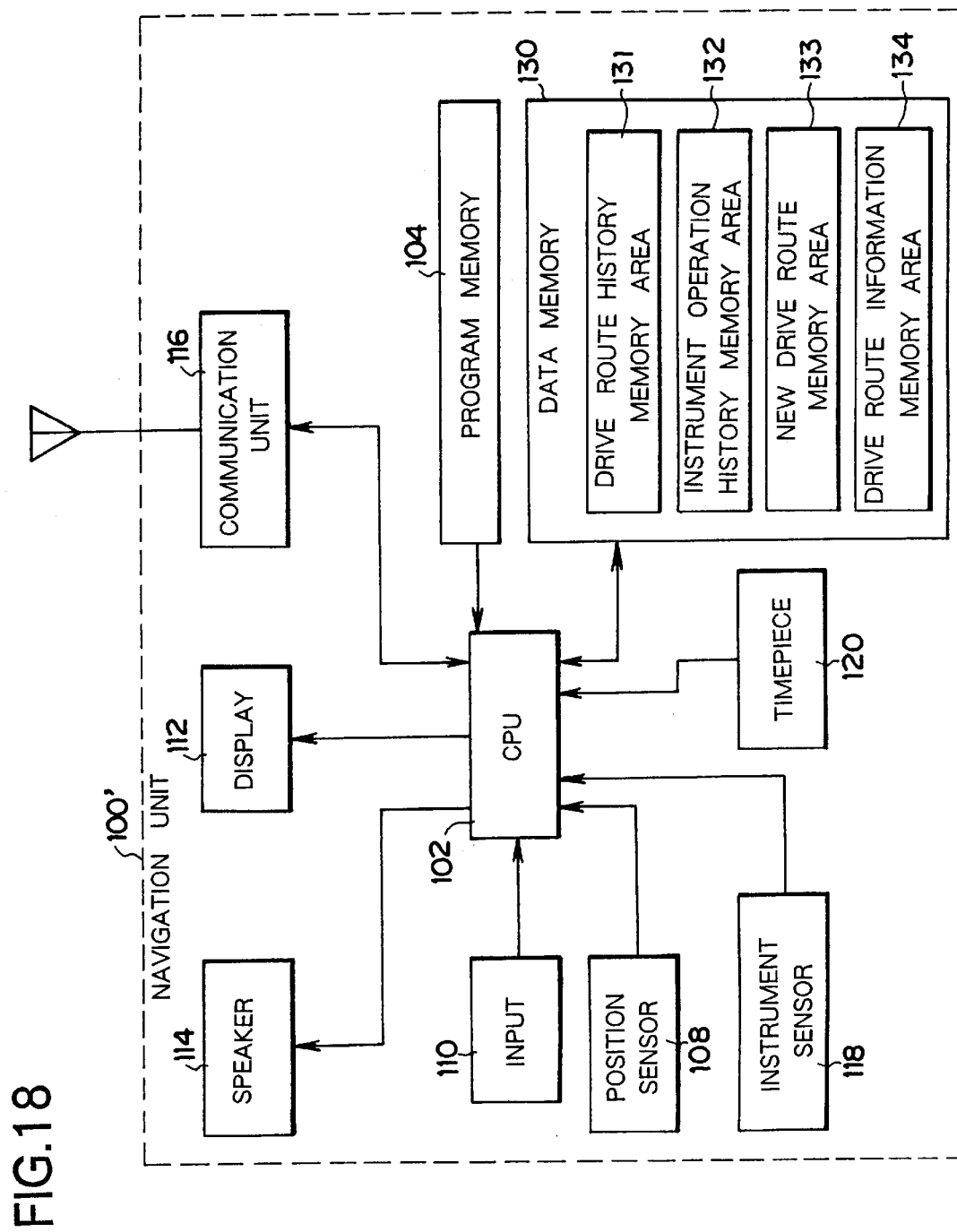
FIG. 18 is a block diagram showing arrangement of the navigation unit in the communicatory navigation system of a modified embodiment in which a new drive route or road is identified by the navigation unit and then transmitted to the center.

In the foregoing embodiment, a new drive route is determined by center 150. In a modified embodiment, such a determination is made in a navigation unit mounted on a vehicle that has been running along a new drive route not found in database 158 in center 150. FIG. 18 shows a navigation unit 100' used in a navigation system of such a modified embodiment of the present invention. In FIG. 18, identical or similar elements and parts of navigation unit 200 are referred to by the same numerals as those in navigation unit 100 of the preceding embodiment, and no detailed description thereof will be made herein. In summary, navigation unit 100' includes a new drive route memory area 133 and a drive route information memory area 134 in data memory 130, in addition to all components of navigation unit 100 (FIG. 1).

New drive route memory area 133 stores position data each time position sensor 108 detects a point which could not be found on the existing drive route. In one sense, it stores a trace of the past drive route in previous drive route history memory area 131. However, in this embodiment, previous drive route history memory area 131 stores a predetermined length of the previous driven route that is changed and renewed as the vehicle runs along one of the existing drive routes, whereas new drive route memory area 133 stores an unlimited length of the previous drive route data only when the vehicle is running along a new road or route.

In drive route information memory area 134 are stored drive route data as in database 158 in center 150. This enables the vehicle or navigation unit 200 mounted thereon to execute a new route determination.

Figure 19:
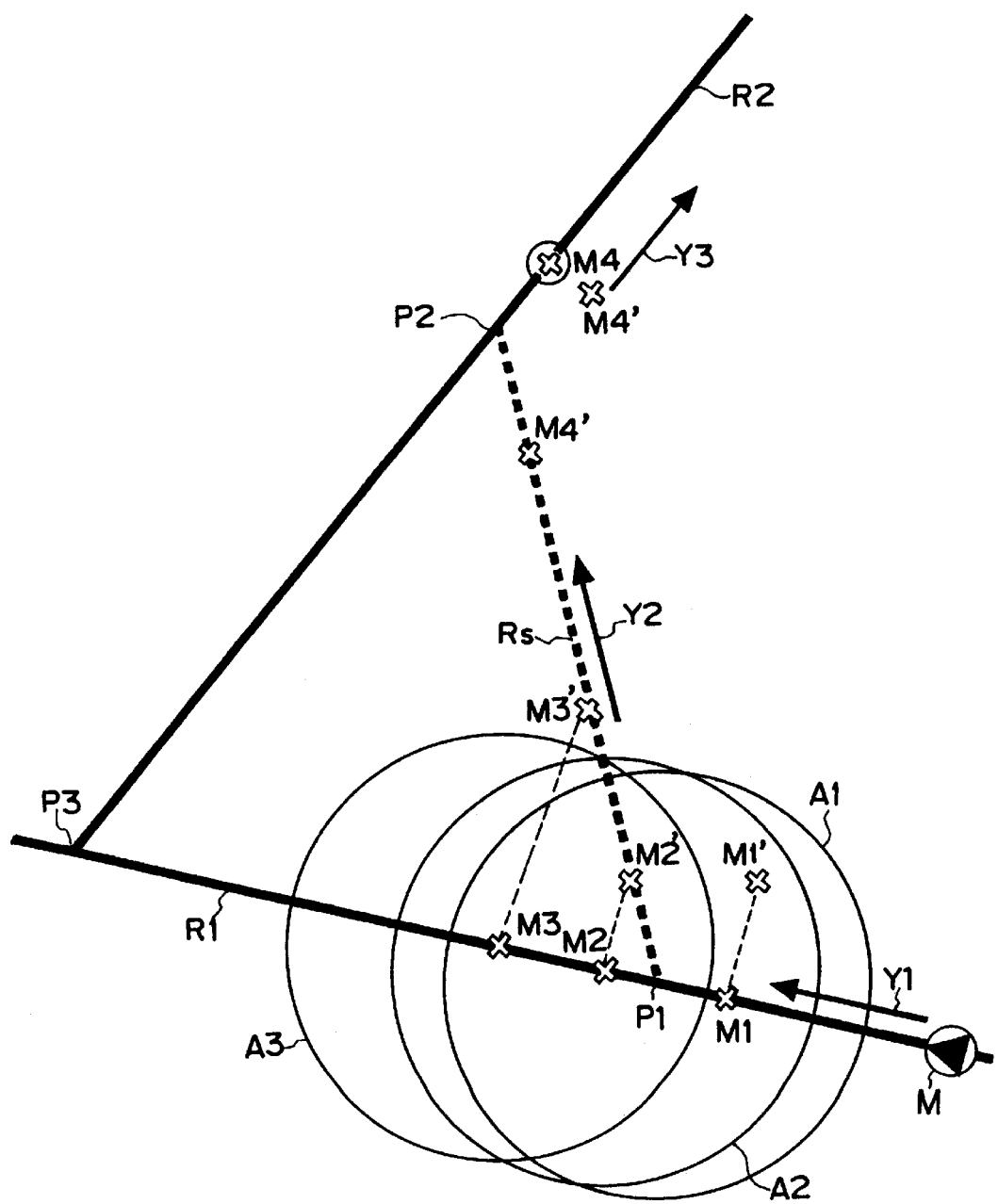
FIG. 19 is an explanatory view illustrating an exemplified manner of new road determination by the navigation unit.

Referring now specifically to FIG. 19 illustrating one method of new road discrimination, in the example of FIG. 19, the vehicle (M) that has been running in a direction (Y1) along an existing road (R1) leaves that route at a branch point (P1) and travels a road (Rs) not stored in the database, running in a direction (Y2), and then drives onto another existing road (R2) at a junction point (P2) in a direction (Y3). In other words, the driver prefers a shortcut (Rs) rather than running a long way round from (P1) to (P2) via a junction point (P3) between (R1) and (R2).

Figure 20:
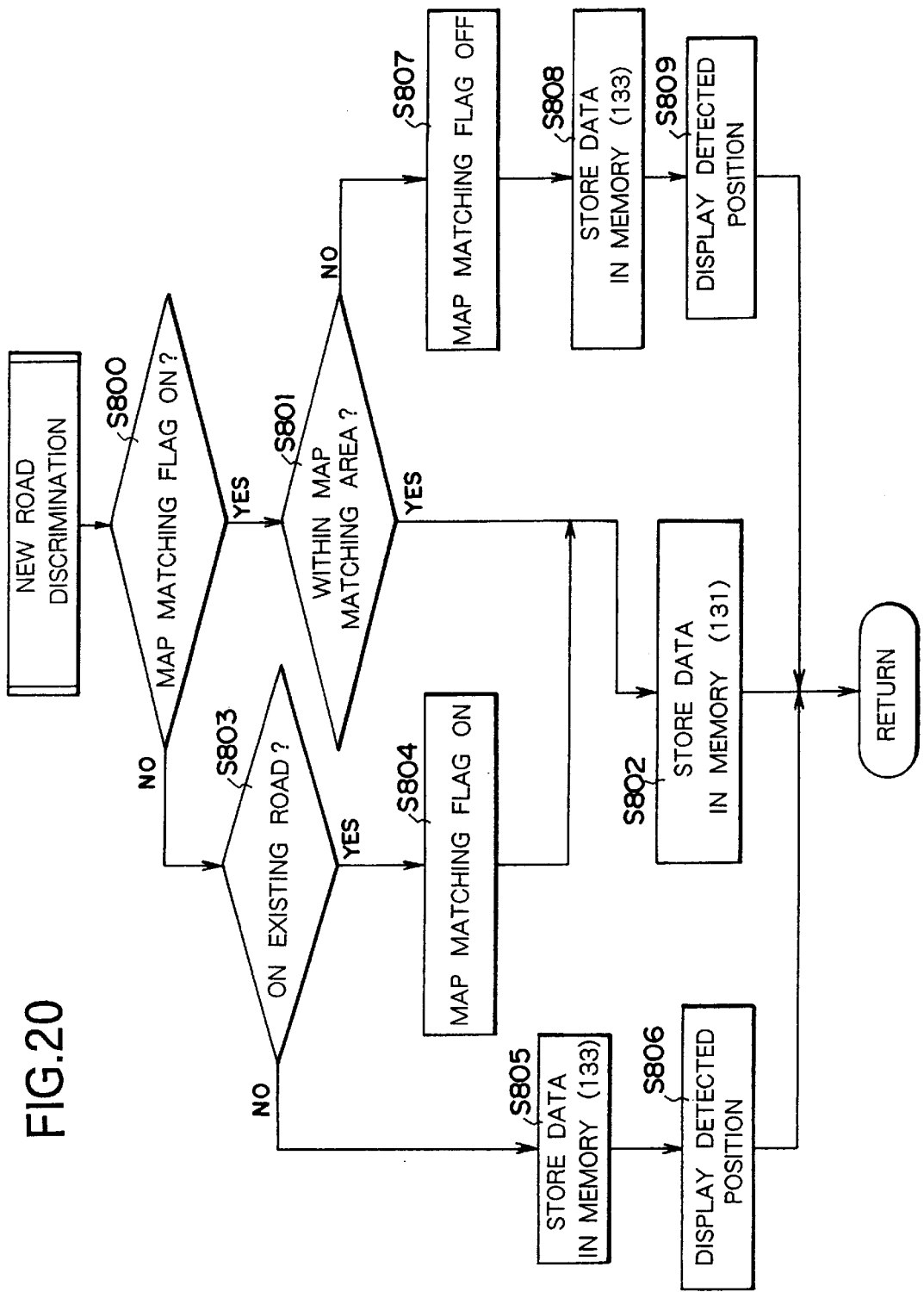
FIG. 20 is a flowchart of new road determination executed by the navigation unit, which begins with map matching discrimination in this embodiment.

New road discrimination proceeds in accordance with the new routine of the flowchart of FIG. 20, which is executed each time position sensor 108 detects a vehicle current position. This procedure starts at S1060 where it is determined if a map matching flag is ON. Map matching discrimination will be explained with respect to the example in FIG. 19. When the vehicle current position (M1') is detected, the nearest point (M1) on the existing road (R1) is specified, and a circular matching area (A1) of a predetermined diameter having a center at (M1) is specified to determine if the current position (M1') is within the matching area (A1). When this is the case, the map matching flag is turned on so that a predetermined map matching routine (not shown) is executed in accordance with a map matching program stored in program memory 104. Thus, it is determined that the offset current position (M1') is due to a detection error and is regarded as being in fact located on (R1), and the position of (M1') on the map in display 112 is corrected to (M1).

Imagine that such map matching is applied to the current position (M2'). Since it is within a map matching area (A2) having the center at the nearest point (M2), there is obtained the same result so that the detected current position (M2') is corrected as (M2). However, in the case of (M3') that is greatly offset from any existing road and located beyond a map matching area (A3) having the center at the nearest point (M3), the map matching flag becomes OFF and the map matching operation is not executed.

While the vehicle is running along (R1), the detected positions will usually be located within their map matching areas so that the map matching flag is ON (Yes at S800 in the flowchart of FIG. 20), and the newly detected vehicle position is also within its map matching area (Yes at S801). Accordingly, data indicating the detected vehicle position and time when it is detected by sensor 108 are stored in past drive route history memory area 131, at S802. Data in past drive route history memory area 131 is renewed by each detection in such manner that the oldest one is replaced by the new entry data, as far as the detected position is within a map matching area.

Even after the vehicle enters (Rs), as long as its position (for example, (M2') in FIG. 19) still remains within its map matching area (A2), the procedure is executed by S800, S801 and S802 in that order, as above described. When the vehicle continues to drive along (Rs) in the direction (Y2) so that its position (M3') is no longer recognizable within its map matching area (A3), discrimination at S801 produces a "No" result so that the map matching flag is turned OFF for the next execution of the routine of flowchart of FIG. 20, at S807. Then, at S808, the detected data is stored in new drive route memory area 133, and the current position is displayed on the road map of display 112 at S809.

Thereafter, while the vehicle is running along route (Rs), the map matching flag remains OFF (No at S800) and the result of discrimination at S803 remains No. It is determined at S803 whether the detected position is on any one of the drive routes already stored in drive route information memory area 134. Then, at S805, the detected data (position and time) is stored in new drive route memory area 133 and, at S806, the detected position (M3') is displayed on the road map of display 112 as being offset from the existing roads (R1) and (R2).

When the vehicle reaches the junction point (P2) and now begins to run along (R2), sensor 108 detects the vehicle position (M4) on (P2) or its map-matchable position (M4'). When such a vehicle position is first detected, the current status (by the result of the last execution of the routine of flowchart of FIG. 20) of the map matching flag is OFF (No at S800) but the result of discrimination at S803 is Yes. In this case, the map matching flag is turned on at S804 for the next execution, and the detection data are stored in past drive route history memory area 131, at S802.

By repeated execution of new road discrimination in accordance with the flowchart of FIG. 20, a series of vehicle position data from P1 to P2 that suggests a new drive route is stored in the database in memory area 134. Such new drive route data is included in the drive route history data in the vehicle information to be supplied from navigation unit 200 to center 150 (particularly refer to FIG. 3 in the preceding embodiment). In response to receiving the new drive route data, center 150 updates database 158 so that the newly recognized road or route may be included in the drive route information for transmitting to any vehicle communicatably connected thereto.

Although the present invention has been described and illustrated with reference to the previously described embodiments, the present invention is not limited to these embodiments and permits various changes and modifications within the spirit and scope of the invention defined in the appended claims. For example, communication between the navigation unit and the information center may be achieved by VICS (vehicle information and communication system).

What is claimed is:

1. A navigation device, mounted on a vehicle, comprising:
   sensor means for detecting current position of the vehicle;
   first memory means for storing the current position detected by said sensor means;
   data communicating means connectable with an information center remote from the vehicle through any telecommunication link, for data transmission to and from the information center; and
   transmission control means for controlling operation of said data communicating means so that the current position stored in said first memory means is automatically transmitted to the information center through a telecommunication line during a period in which a connection is established through the telecommunication link for transmission of a drive route information representing a specific drive route from the current position to a given destination which has been determined by the information center.

2. A navigation device according to claim 1 which further comprises:
   second memory means for storing the drive route information received by said receiving means, and
   guide means, operated in response to the drive route information stored in said second memory means, for guiding the vehicle to run along the drive route determined by the information center.

3. A data transmitting device mounted on a vehicle for transmitting vehicle information to an information center remote from the vehicle, said device comprising:
   sensor means for detecting the vehicle information;
   memory means for storing said vehicle information detected by said sensor means;
   data communicating means connectable with the remote information center through any telecommunication link, for data transmission to and from the remote information center; and
   transmission control means for controlling operation of said data communicating means so that the vehicle information stored in said memory means is automatically transmitted to the information center through a telecommunication link during a period in which a connection is established through the telecommunication link for data transmission from the remote information center to the data communicating means.

4. A data transmitting device according to claim 3 wherein said vehicle information stored in said memory means comprises current position of the vehicle detected by said sensor means.

5. A data transmitting device according to claim 3 further comprising a clock for generating data indicating time and wherein said vehicle information comprises current position of the vehicle, detected by said sensor means, in combination with data indicating time when said current position is detected.

6. A data transmitting device according to claim 3 wherein said sensor means detects at least one of current status of an accessory mounted on the vehicle, vehicle conditions and environmental conditions, and wherein the information detected by said sensor means is stored in said memory means correlated with data indicating place and time where and when said vehicle information is detected.

* * * * *